UNITED STATES PATENT OFFICE.

THOMPSON HANNA, OF PITTSBURG, PENNSYLVANIA, ASSIGNOR OF ONE-HALF HIS RIGHT TO THOMPSON S. HANNA, OF SAME PLACE.

IMPROVEMENT IN THE MANUFACTURE OF VULCANIZED FIBER.

Specification forming part of Letters Patent No. 196,895, dated November 6, 1877; application filed October 13, 1877.

*To all whom it may concern:*

Be it known that I, THOMPSON HANNA, of Pittsburg, in the county of Allegheny, State of Pennsylvania, have invented certain new and useful Improvements in the Utilization of the Chloride-of-Zinc Solution used in the Manufacture of Vulcanized Fiber; and I do hereby declare the following to be a full, clear, and exact description of the same, such as will enable those skilled in the art to carry it into effect.

My invention has reference to the utilization of either the liquid produced in the process of cleansing, or of the mother-liquor of chloride of zinc after it has been used in the treatment and manufacture of paper, as described in Letters Patent Nos. 113,454 and 114,880.

In the said Letters Patent, the paper or paper-pulp is described as being treated to a bath of the mother-liquor resulting from the manufacture of chloride of zinc, or the chlorides of tin, calcium, magnesium, or aluminum, or to a bath of the concentrated solution of chloride of zinc, directly produced.

For use in treating paper by this method, the solution or bath is concentrated by heat to about 65° to 75° Baumé. After being treated in the solution the paper is removed to a cleansing-bath of clean water, in which it is washed until free from all surplus liquor. After such washing, the cleansing-bath contains a large percentage of the chloride-of-zinc solution; and my invention consists in utilizing the same by submitting it to the action of chemical reagents, whereby I produce other chemicals which can be sold for enough to cover the cost of the process, and thereby effect a large saving in the manufacture of such material.

In the processes above referred to, it requires about four pounds of the concentrated solution of chloride of zinc to treat one pound of paper, the cost of said solution being, at present, about six cents per pound.

In carrying out my invention I proceed in the prescribed manner, and wash the treated paper in a cleansing-bath; but I continue to use the same water until it has absorbed enough of the chloride of zinc to raise it to from 30° to 40° Baumé, more or less. I then add to it a solution of carbonate of soda sufficient to cause a complete chemical reaction, the result being that carbonate of zinc is precipitated, and chloride of sodium remains in solution.

The superior advantage which I claim for my process over that of evaporating the solution is that the precipitated carbonate of zinc commands a high price, and can be sold for as much as, or more than, the original cost of the solution, thus giving the treatment without cost; or, being dissolved by hydrochloric acid, can be again used in the treatment of paper or other vegetable fiber, with the result as above stated.

Of course, it is obvious that the specific reagent above given may be replaced by others with similar results, differing only in degree—as, for instance, instead of carbonate of soda, carbonate of potash might be used, or any of the alkaline carbonates. In fact, we may use such reagents as will, by combined reaction, produce the desired zinc-salt, and also another salable or comparatively valuable product.

What I claim, and desire to secure by Letters Patent, is as follows:

1. In the described processes of manufacturing vulcanized fiber, the method of utilizing the waste or cleansing bath, holding chloride of zinc in solution, consisting in submitting it to the action of chemical reagents, substantially as set forth.

2. In the process of utilizing the said cleansing-bath, holding chloride of zinc in solution, the method of recovering the zinc by submitting the solution to the action of another solution, in water, of a salt having, in its combination, an acid whose anhydrous constituent has superior affinity for the zinc, whereby the two form a new combination, substantially as specified.

In testimony whereof I have hereto set my hand this 10th day of October, A. D. 1877.

THOMPSON HANNA.

Witnesses:
T. S. HANNA,
T. J. McTIGHE.